Aug. 16, 1955        J. C. GOODGION        2,715,373
BAFFLE TUBE FOR COMBUSTION CHAMBER
Filed March 10, 1951        2 Sheets-Sheet 2
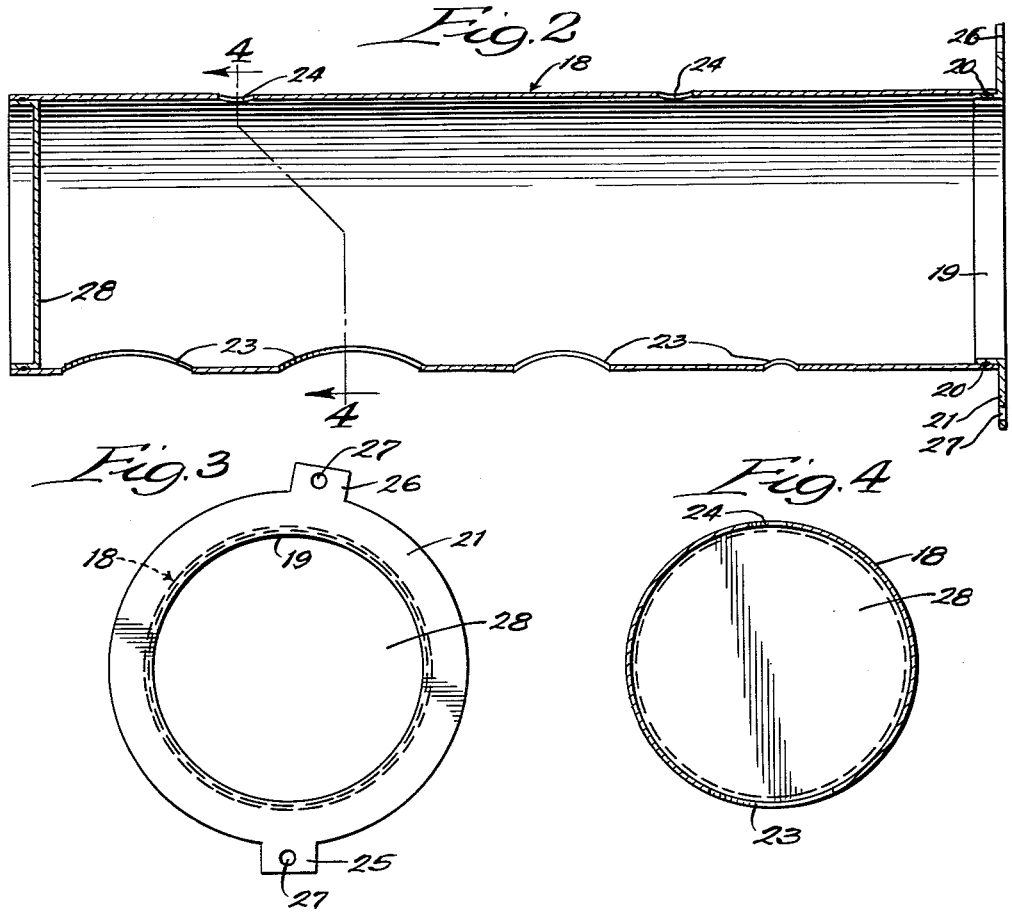
INVENTOR:
James C. Goodgion,
BY
Dawson & Ooms,
ATTORNEYS.

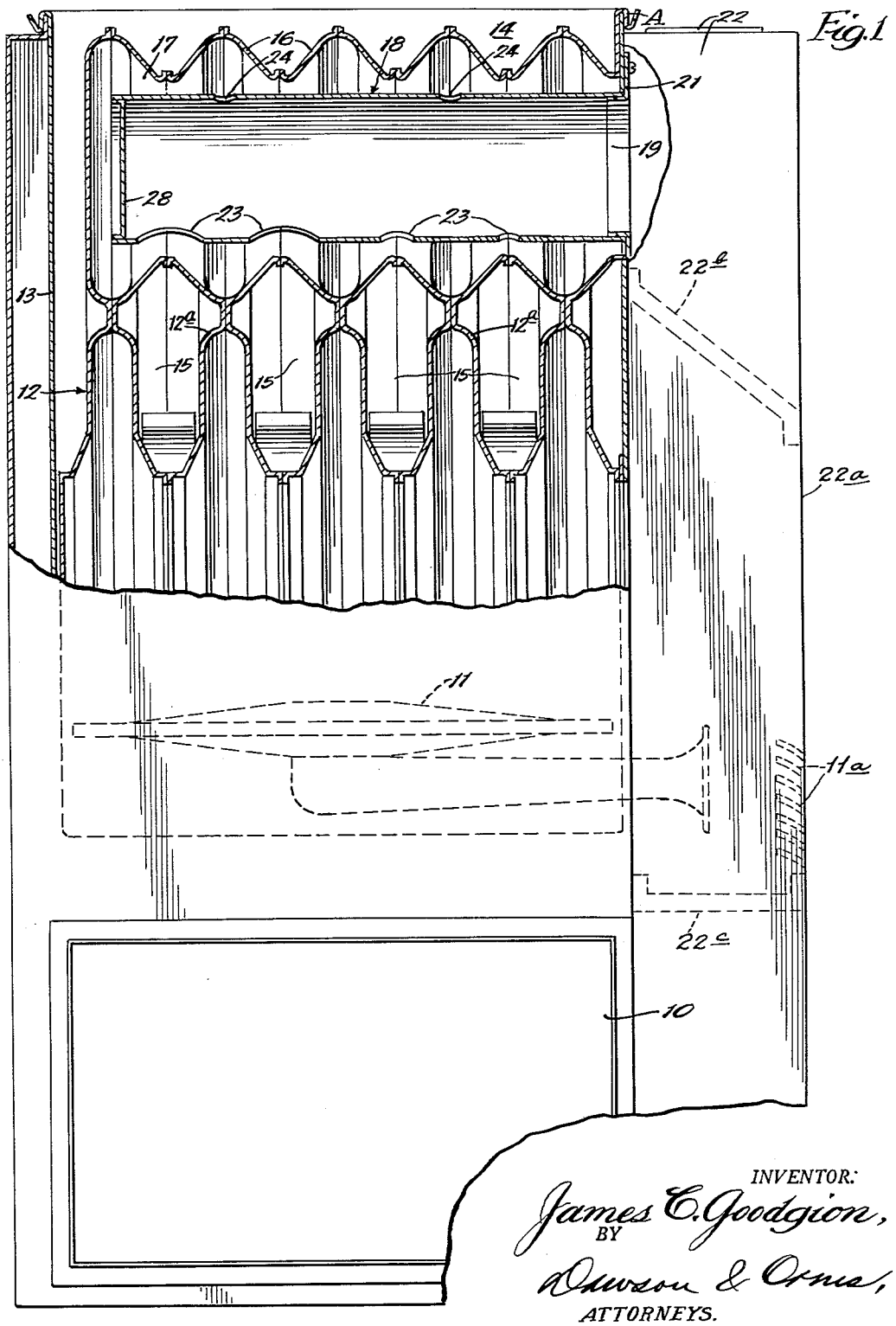

United States Patent Office 2,715,373
Patented Aug. 16, 1955

2,715,373

BAFFLE TUBE FOR COMBUSTION CHAMBER

James C. Goodgion, Wichita, Kans., assignor to The Coleman Company, Inc., Wichita, Kans., a corporation of Kansas Application March 10, 1951, Serial No. 214,979

8 Claims. (Cl. 110—97)

This invention relates to a baffle tube for a combustion chamber. The invention is particularly useful in combination with an air heating furnace.

An object of the invention is to provide in a furnace effective means for holding the combustion gases in the heat exchange compartment of the furnace as long as possible before releasing them to the outlet flue, whereby effective heat exchange between the air about the compartment is effected to a high degree. Yet another object is to provide in such a furnace means for withdrawing the combustion gases in such a manner as to distribute their withdrawal over a wide area in the upper portion of the combustion chamber. A still further object is to provide a tube extending across the upper portion of the combustion chamber and communicating with the outlet therefrom while providing metering openings for controlling the inflow of gases into the tubes, the metering openings being distributed longitudinally of the tube. A still further object is to provide in such a structure means for insuring correct assembly of the tube to require that the openings thereof be placed in the desired location. Other specific objects and advantages will appear as the specification proceeds.

The invention is shown in an illustrative embodiment by the accompanying drawings, in which—

Figure 1 is a broken side view in elevation of a furnace equipped with a baffle tube structure embodying my invention, the upper portion of the furnace being shown in vertical section; Fig. 2, an enlarged sectional view of the baffle tube; Fig. 3, a plan view of the attachment plate with which the tube is equipped; and Fig. 4, a transverse sectional view, the section being taken as indicated at line 4—4 of Fig. 2.

In the illustration given, A designates a furnace which may be of any suitable construction. It will be understood that a great variety of furnaces for heating hot air may be effectively employed in connection with the present invention, and the furnace hereinafter set out is described for the purpose of illustrating one of such furnaces. In the illustration given, air enters through an inlet provided with a filter 10 and passes upwardly and around a combustion chamber casing 12. Air for the burner 11 is drawn into the combustion chamber from a point laterally of the casing 12, such as the lowered inlet 11a illustrated in dotted lines in Fig. 1 and which is in communication with the combustion chamber. The combustion chamber casing is surrounded by a furnace casing 13 and between casings 12 and 13 is provided a space through which the entering air passes. The heated air which rises up past the casing 12 leaves the furnace through the open upper side 14. It will be understood that the furnace may here be provided with a grill through which the heated air passes, or with a bonnet providing a chamber from which the air is passed through pipes to heater outlets. In such a structure, a blower is provided in the space inwardly of the filter 10 to force the air upwardly and out of the upper portion of the furnace. Since the invention herein is applicable to any type of heater in which a casing provides a combustion chamber communicating with an outlet, it is believed unnecessary to describe in further detail the heater illustrated.

The combustion chamber casing 12 provides a chamber to receive the combustion gases from the burner 11 and may be formed in the irregular shape illustrated to increase the exposed surface area for contact with the outside air which is to be heated. The casing also may provide air channels 15 through which the rising air may pass in contact with inner casing walls 12a. The casing walls 12a which provide the transverse air passages 15 provide with the undulating top walls 16 of the casing 12 an annular space 17 in the upper portion of the combustion chamber. Into this annular space extends the baffle tube 18. The baffle tube 18 is provided at its outer end with a ring 19 which is welded at 20 to the baffle tube 18 and which is provided with an outwardly-extending flange 21, by means of which the tube may be secured to the furnace casing. The heater structure or furnace is shown in greater detail in the co-pending application, now abandoned, of Dean Olds and Shirley Campbell for Pressure Shell for Combustion Chamber in Hot Air Furnace, Serial No. 214,968, filed March 10, 1951, which is assigned to the same party as the present application.

An outlet flue 22 is provided at one side of the casing near the upper end of the furnace with which the tube 18 communicates. It will be understood that the flue 22 communicates with a pipe leading to a stack or exhaust chimney. The elongated casing 22a providing the flue is equipped with partitions 22b and 22c to provide an independent chamber through which the inlet 11a communicates with the interior of the combustion chamber about the burner 11.

The baffle tube 18 is provided with spaced openings 23 along its lower side so as to meter the introduction of combustion gases and to distribute them evenly throughout the length of the tube.

I also prefer to provide the tube with inlet openings 24 spaced along the top of the tube for the withdrawal of gases collecting along the top of the combustion chamber.

The meter openings of the tube 18, which extend longitudinally of the tube, are effective in causing the gases to travel with substantially uniform distribution in a vertical path through the chamber and to be withdrawn into the tube throughout its length. Further, such openings are effective in holding the combustion gases in the chamber as long as possible while withdrawing them finally in an evenly-distributed manner. It will be understood that the openings 23 and 24 may be varied in location to meet the demands of different types of combustion chambers. I prefer, however, to provide openings which are distributed longitudinally of the tube for the purposes which have already been set out.

In order to insure the proper location of the tube 18, when it is assembled within the furnace, I provide the flange 21 with non-diagonally extending attachment ears 25 and 26. The ears are provided with openings 27 for receiving attachment screws, and because the ears are angularly related as illustrated in Fig. 3, the pipe 18 must be properly located within the chamber before the ear openings will be brought into proper alignment with the threads in the casing.

The tube 18 is readily removable. Upon the removal of the outlet flue structure 22, which is accomplished by removing one screw (not shown), the meter or baffle pipe 18 may be freed by removing the screws passing through the openings 27 of ears 25 and 26 and the pipe 18 may be then readily removed. The removal of the pipe 18 is often desired for the purpose of cleaning the tube and sometimes when there is a fuel with which it may be desirable to eliminate the use of the tube 18 entirely. For example, the tube 18 may be employed when the furnace is burning gas, but may be removed, if desired, when the furnace is employed for burning oil.

*Operation*

In the operation of the furnace structure, the combustion gases within the combustion chamber flow upwardly to the top of the chamber and are withdrawn through the meter openings 23 and 24 of tube 18. The withdrawn gases pass laterally into the outlet flue 22 and escape through the chimney or stack in the usual manner. The air to be heated passes through the filter 10 and around the combustion chamber casing 12 and escapes though the open top portion 14 of the furnace or through any bonnet or other chamber connected therewith.

The disposition of the meter openings 23 longitudinally of the tube 18 causes the combustion gases to rise in generally vertical paths through the width of the combustion chamber so that each portion of the combustion chamber casing is substantially uniformly heated.

The combustion chamber casing 12 in the illustration given, is closed except for an inlet near its bottom side for admitting air to the burner 11 and except for the opening at its top through which the tube 18 communicates with the flue 22. It will be understood that the lower portion of the structure 22 is provided with an aperture through which air enters for supplying the necessary air to the burner 11.

In the structure shown, the mounting of the tube 18 within the annular space provided between the undulating top wall 16 and the inner casing walls 12a is highly effective in retaining the combustion gases within this area as long as possible, while at the same time removing them at points spaced longitudinally of the upper chamber portion. The hot gases flow inwardly through the meter openings 23 in the lower portion of the tube 18, while also hot gases from the top of the casing pass downwardly and into the tube 18 through the longitudinally-spaced openings 24.

The tube 18 may be closed at its inner end by any suitable means as, for example, by the closure plate 28 or by any other suitable imperforate or perforated member.

It will be understood that the size of the apertures 23 or 24 may be varied, some of the openings being larger than the others. If, for example, greater difficulty is encountered in drawing the gases from the rear section (which is most remote from the supply of combustion air and, therefore, most starved for air), the opening adjacent thereto may be the largest of the openings. For the same reason, the opening adjacent the second section may be next largest, and so on until the opening adjacent the first section and nearest the outlet may be the smallest in the series. By thus varying the size of the openings in the tube 18, secondary air for combustion may be drawn to a rear section or other selected section which might otherwise be starved for air.

The tube provides a ready means for cleaning not only the tube but the interior of the combustion chamber, since upon the removal of the tube, ready access is provided to the interior. Further, a minimum of noise results from the suspending of the tube 18 in the manner shown. The bracket ring 21 supports the tube 18 freely within the chamber and preferably a gasket is interposed between this and the shell body.

The new structure provides an accurate and effective means of calibrating the flow from each section of the combustion chamber; it provides an easy means for removal to permit cleaning of the surfaces; and it accomplishes the foregoing important results while eliminating noise.

While in the foregoing specification I have set forth a specific structure in considerable detail for the purpose of illustrating an embodiment of the invention, it will be understood that such details of structure may be varied widely by those skilled in the art without departing from the spirit of my invention.

I claim:

1. In combination with a casing providing a combustion chamber and an outlet flue therefor, a tube substantially closed at its inner end and in open communication at its outer end with said flue, said tube projecting inwardly across said chamber and being provided with at least one row of longitudinally-spaced metering apertures along one side thereof, said tube being equipped adjacent the open end thereof with laterally-extending flanges provided with apertured attachment ears disposed on opposite sides of said tube and in asymmetrical relation and having openings therethrough, and said casing being provided with openings alignable with the openings in said ears for receiving fastening members to support said tube within said chamber with said metering apertures in accurate predetermined relation relative to said combustion chamber.

2. The structure of claim 1 in which said row of metering apertures is disposed along the bottom of said tube, and in which a second row of longitudinally-spaced metering apertures is disposed along the top of said tube.

3. The structure of claim 1 in which an attachment ring is secured to the open end of said tube and said laterally-extending flanges are provided thereby.

4. In combination with a casing providing a combustion chamber and an outlet flue therefor, a tube communicating at one end with said flue and projecting inwardly across the chamber, said tube being substantially closed at its inner end and throughout its length except for metering apertures spaced apart along the length of the tube and on one side thereof, and a ring support secured to the open end of said tube and equipped with laterally-extending flanges providing asymmetrical fastening means, and asymmetrical fastening means carried by said casing and alignable with said first-mentioned fastening means in one position of said tube for securing said laterally-extending flanges to said casing with said apertures in predetermined position relative to said combustion chamber.

5. In combination with a casing providing a combustion chamber and an outlet flue therefor, a tube in open communication at one end with said flue and projecting inwardly therefrom across the chamber, said tube being substantially closed throughout its length except for at least one metering aperture provided therein, said metering aperture being located in the longitudinal peripheral surface of said tube to assume a preselected position relative to said combustion chamber when said tube is mounted therein, and a support carried by said tube and providing asymmetrical fastening members alignable in one position of said tube with complementary fastening means provided by said casing so that said tube is mountable in said chamber with said aperture oriented in predetermined relation relative to the combustion chamber.

6. The structure of claim 5 wherein means are provided for releasably securing said fastening members to said casing, whereby said tube is removable and is replaceable with said aperture accurately oriented within said chamber.

7. In a structure of the character described, a casing providing a plurality of combustion chamber sections, said sections being disposed one above another and being in communication with each other, the uppermost section being equipped with an outlet flue, a baffle tube extending freely across said uppermost section and at one end thereof being in open communication with said outlet flue, said tube being provided with a plurality of axially spaced metering apertures and having a substantially closed inner end, means for removably supporting said tube within said uppermost section, and air supply means for admitting combustion air into said combustion chamber, said metering apertures being graduated in size and arranged so that the largest thereof are most remote from said air supply means.

8. The structure of claim 7 in which at least some of said metering apertures are in substantial alignment along the bottom of said tube, and in which said tube is equipped with a flange adjacent said outlet flue, means being provided for releasably securing said flange to said casing.

References Cited in the file of this patent

UNITED STATES PATENTS

| | | |
|---|---|---|
| 57,481 | Conver | Aug. 28, 1866 |
| 73,422 | Wilson | Jan. 14, 1868 |
| 345,293 | Finch | July 13, 1886 |
| 2,395,594 | Ulberg | Feb. 26, 1946 |